(12) United States Patent
Piepho et al.

(10) Patent No.: US 6,381,829 B2
(45) Date of Patent: May 7, 2002

(54) METHOD FOR MAKING AN IMPROVED MAIN SHAFT FOR A COAL PULVERIZER BY EMPLOYING A CERAMIC COATING THEREON

(75) Inventors: Robert R. Piepho, Wadsworth; David W. Gerber, Massillon, both of OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 09/922,662

(22) Filed: Aug. 6, 2001

Related U.S. Application Data

(62) Division of application No. 08/868,867, filed on Jun. 5, 1997, now Pat. No. 6,270,026.

(51) Int. Cl.[7] .............................................. B23P 17/00
(52) U.S. Cl. ..................................... 29/527.4; 427/453
(58) Field of Search ................................. 241/207, 208, 241/214, 215; 29/527.2, 527.4, 90.7; 427/463, 327, 331

(56) References Cited

U.S. PATENT DOCUMENTS

| | | | |
|---|---|---|---|
| 4,230,748 A | * | 10/1980 | Patel |
| 4,371,312 A | * | 2/1983 | Tank |
| 4,746,532 A | * | 5/1988 | Suzuki et al. |
| 5,464,163 A | * | 11/1995 | Zoz |
| 5,609,553 A | * | 3/1997 | Hyllberg |
| 5,810,269 A | * | 9/1998 | Shannon |
| 5,820,045 A | * | 10/1998 | Karra |
| 6,051,279 A | * | 4/2000 | Gualco et al. |

OTHER PUBLICATIONS

ASB Industries, Sales Brochure "Carbide Thermal Spray Surfacing," admitted prior art. undated.*

Riley Stoker Co., "Failures in E– and EL–Type Pulverizer Mill Main Drive Shafts," Power–Gen '94, Orlando, FL. Dec. 1994.*

"Second National Conference on Thermal Spray," ASM, Oct. 1994.*

* cited by examiner

*Primary Examiner*—David P. Bryant
(74) *Attorney, Agent, or Firm*—R. J. Edwards; Eric Marich; K. W. Grant

(57) ABSTRACT

An improved main shaft for a coal pulverizer having a selected portion of the main shaft provided with an intervening material such as a thermally sprayed ceramic coating.

15 Claims, 4 Drawing Sheets

METHOD FOR MAKING AN IMPROVED MAIN SHAFT FOR A COAL PULVERIZER BY EMPLOYING A CERAMIC COATING THEREON

This is a divisional application of U.S. Ser. No. 08/868,867, filing date Jun. 5, 1997, now U.S. Pat. No. 6,270,026.

BACKGROUND OF THE INVENTION

1. Field of the Invention

The present invention relates in general to an improved main shaft for a coal pulverizer, and more particularly to an improved main shaft for use in B&W Type E and EL pulverizers

2. Description of the Related Art

Coal pulverizers are widely used in the electric utility industry for the preparation of crushed coal for efficient combustion. A dominant type of pulverizer for this service is the vertical spindle type. For many years this type featured an integral speed reducer. The output shaft for the speed reducer has a closely fitted mechanical joint with the grinding table and this joint is subjected to severe stresses from driving forces and from impact, shock, and eccentric loading from the grinding process.

FIG. 1 shows a cross section of a B&W type EL pulverizer generally depicted as numeral 2. These devices are used to crush coal for burning in a furnace or boiler. This type of pulverizer has a stationary top ring 4, one rotating bottom ring 6, and one set of balls 8 that comprise the grinding elements. The pressure required for efficient grinding is obtained from externally adjustable dual purpose springs 10. The bottom ring 6 is driven by the yoke 12 which is attached to a vertical main shaft assembly 14 of the pulverizer. The top ring 4 is held stationary by the dual purpose springs 10. Raw coal is fed into the grinding zone where it mixes with partially ground coal that forms a circulating load. Pulverizer air causes the coal to circulate through the grinding elements where some of it is pulverized in each pass through the row of balls 8. As the coal becomes fine enough to be picked up by the air it is carried to the classifier where coal of a desired fines is separated from the stream entering the classifier and is carried out with the air. Oversized material is returned to the grinding zone.

The pulverizer is driven by spiral bevel gears positioned on horizontal pinion shaft 16 and vertical main shaft 14 located in the base. Both the vertical main shaft 14 and the horizontal pinion shaft 16 are mounted in roller bearings. Forced lubrication is provided for the entire gear drive by an oil pump submerged in the oil reservoir and gear-driven from the pinion shaft.

Currently, there is some concern as to main shaft 14 failure. It is believed that the failures occur because of bending fatigue originating at fretted surfaces in the lower contact land with the yoke bushing bore. Fretting damage, sometimes referred to as fretting corrosion, is a condition of surface deterioration brought on by very small relative movements between bodies in contact. The fit between the yoke bushing and main shaft is an interference type fit. This type fit generates a stress concentration or multiplier. The pulverizer design generates cyclic or alternating type bending loads in the top end of the main shaft. Because the loads are cyclic, rubbing or fretting corrosion will occur. Also of concern is fatigue failure when stress concentration, cyclic loading and fretting corrosion are combined. Like fretting, fatigue has a definite set of characteristics which combine to identify this failure phenomenon. Pulverizer vibration usually results in high shaft stress levels and may have a role in main shaft failures. Vibration may be caused by abnormal grinding element wear such as out-of-round wear of balls or rings. Pulverizer vibration also will occur if proper air/fuel regulation for the burners is not provided.

Because of the foregoing, there have been many attempts to correct main shaft failure frequency such as employing an anti-seize compound at the taper joint, using a bushing with a undercut center portion, using full contact bushings with no undercut center portion, shot peening, and nitriding as a surface hardening process. Remedial efforts notwithstanding, even carefully fitted taper joints, when subjected to cyclic bending forces often exhibit vulnerability to fatigue failure of shafts because of fretting and strain produced within the assembly.

There still exists a need for an improved main shaft assembly for these types of pulverizers, one that will provide improved fretting resistance to reduce shaft failure due to fretting-induced bending fatigue on ball-race coal pulverizers.

SUMMARY OF THE INVENTION

The present invention is directed to solving the aforementioned problems with the prior art as well as others by providing an improved main shaft that provides improved fretting resistance. The present invention comprises an intervening layer of a material such as a thermal sprayed ceramic coating or a thermal setting dry film lubricant between the main shaft and the mating bore in the yoke for reducing local stresses in the shaft within the joint by reducing the relative movement.

An aspect of the present invention is to provide an improved main shaft for a coal pulverizer which is less susceptible to failure.

Another aspect of the present invention is to provide an improved main shaft that is simple in design, rugged in construction, and economical to manufacture.

The various features of novelty which characterize the invention are pointed out with particularity in the claims annexed to and forming a part of this disclosure. For a better understanding of the invention, its operating advantages and specific aspects attained by its uses, reference is made to the accompanying drawings and descriptive matter in which the preferred embodiment of the invention is illustrated.

DESCRIPTION OF THE PREFERRED EMBODIMENTS

Figure 1:
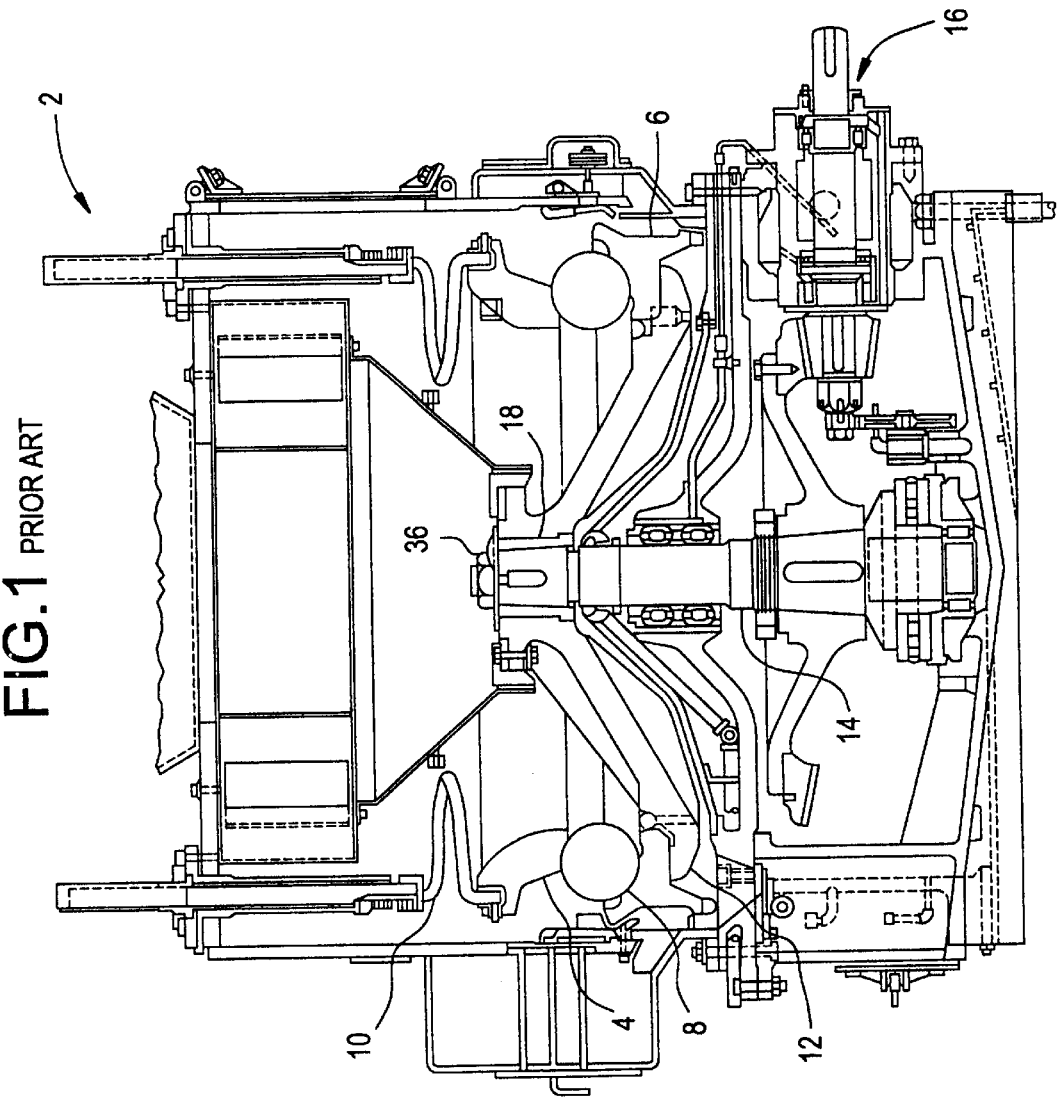
FIG. 1 is a sectional view of a B&W type EL ball and race pulverizer.
Figure 2:
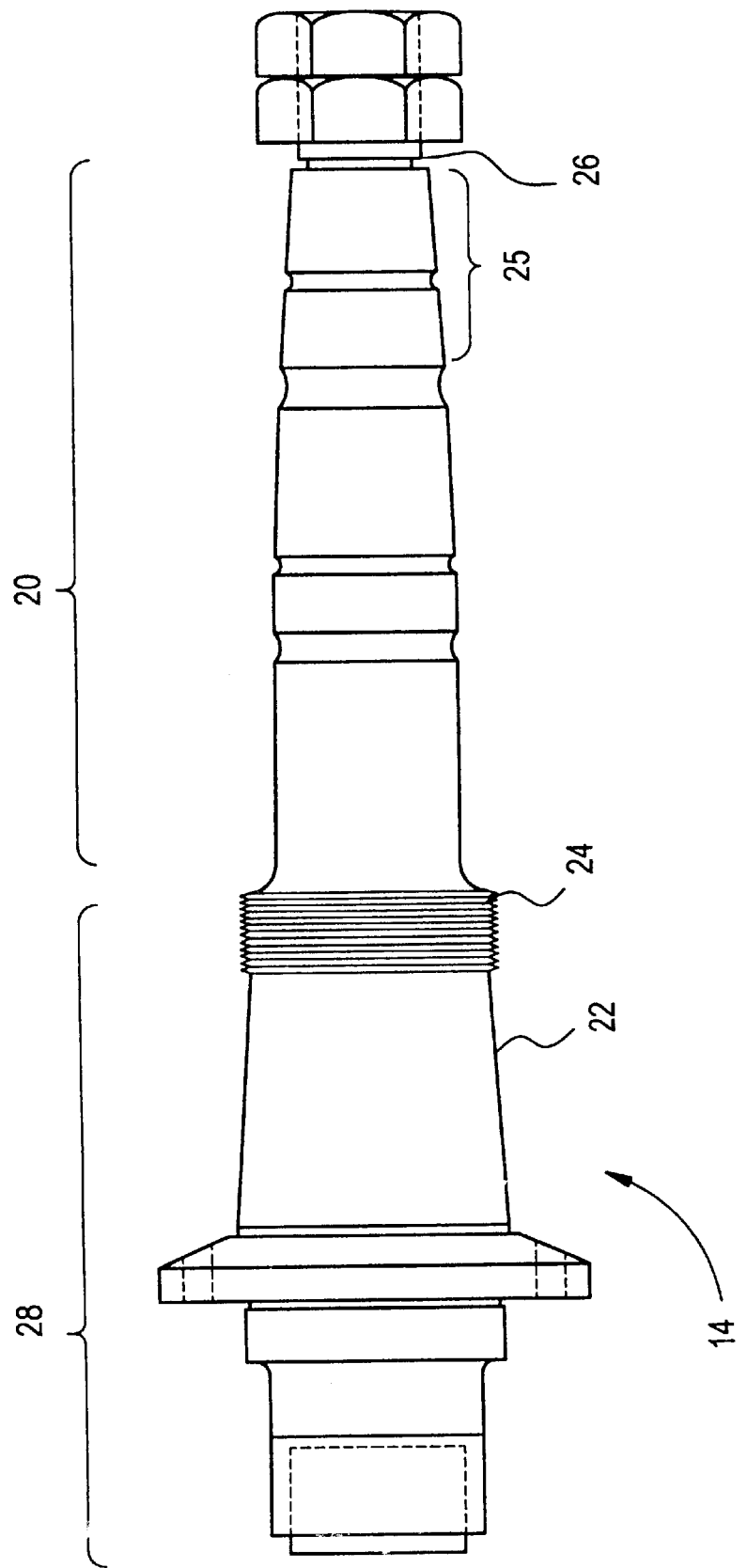
FIG. 2 is an external view of a main shaft employed in such a pulverizer.

The present invention resides in an improved main shaft for a coal pulverizer to reduce shaft failure due to fretting induced bending fatigue.

A suitable material for a coal pulverizer shaft is, for example as presently used, AISI 4340 steel, quenched and tempered, followed by a subcritical quench to improve surface-layer properties. The material is vacuum degassed for cleanliness, minimizing inclusions which can serve as initiation sites for fatigue cracks.

The yoke end (20) of the shaft (22) includes the portion of the shaft (22) starting at the gear center hold-down threads (24) to and including upper taper (25) of the shaft.

The fit or joint between the yoke bushing (18) and upper taper (25) is an interference type fit. This type fit generates a stress concentration or a stress multiplier. This stress concentration increases when the interference fit increases and will also increase when the length of the yoke bushing is increased.

The pulverizer operation generates cyclic or alternate type bending loads in the top end (20) of the main shaft (14). Shaft failures occur, most likely the result of deterioration of the finely machined shaft (14) surfaces within the joint between the shaft (25) and the bore of the yoke (12). This deterioration may be caused by cyclic movement between the respective surfaces of the shaft and the yoke bore. This movement results from bending of the shaft which produces differing stress fields in the shaft (14) and the yoke (12). This movement gives rise to a progressive form of damage known as fretting.

Figure 4:
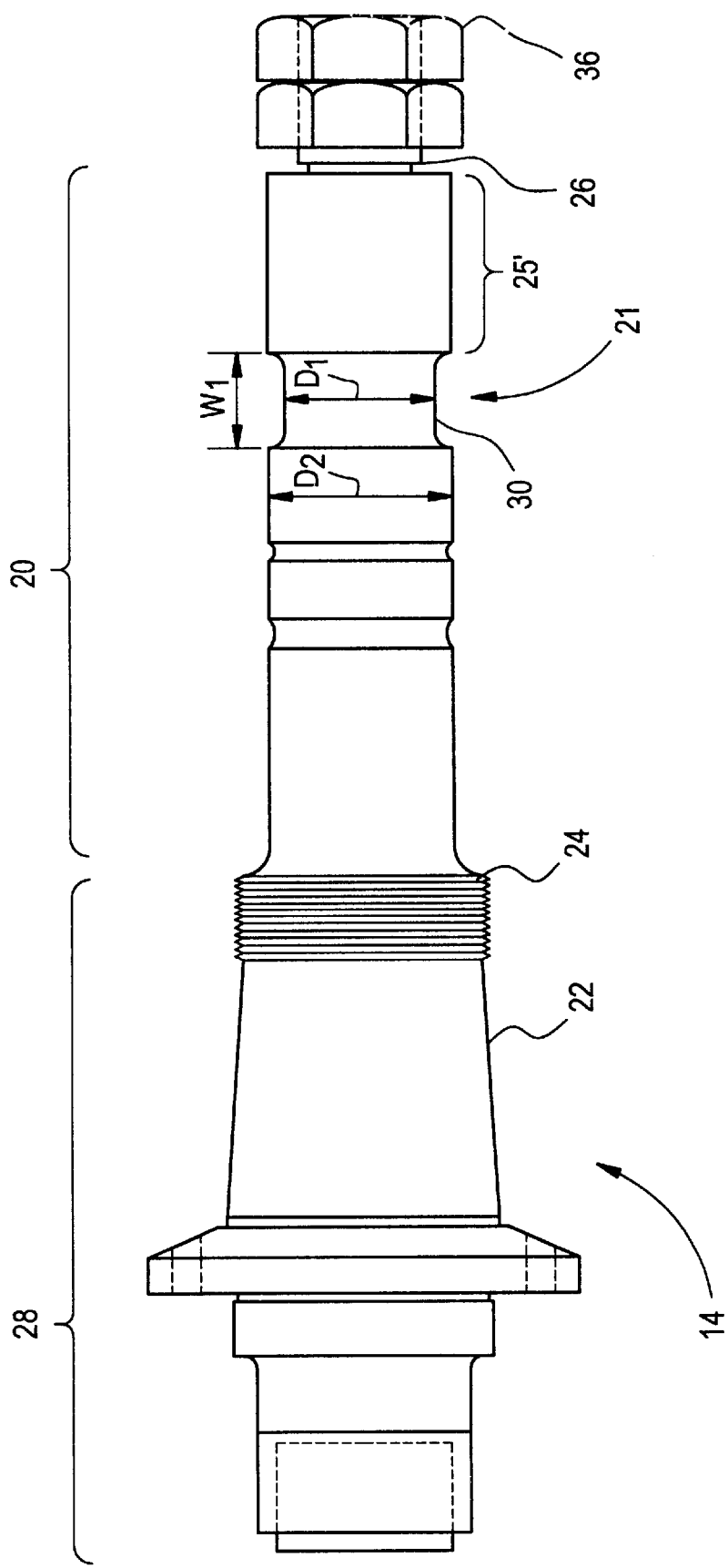
FIG. 4 is an external view of another embodiment of the improved main shaft in accordance with the present invention.

The present invention provides an intervening material between the shaft end (25) and the mating bore in yoke bushing (18) fitted within the bore of yoke (12) to prevent fretting damage. For accurate alignment and for reliable support of the yoke, this joint (21) must be capable of accepting radial, axial, and bending or overturning loads. Preferably, the joint (21) is a tapered joint with the tapered end (25) of shaft (14). The yoke bushing (18) has a mating bore similarly tapered. Shaft end (25) may be constructed for either a keyless or a keyed fit. Also, shaft end (25) alternatively may be cylindrical rather than tapered as seen in FIG. 4.

Assembly of the joint (21) imposes high contact pressure so the intervening layer of material must be very sturdy. A material having low friction in contact with steel can allow movement without causing fretting. The material must be suitable for refinement of its surface to a high finish for accurate fit-up.

An intervening material which meets these requirements is a thermal sprayed ceramic coating such as chrome oxide or a carbide coating like tungsten carbide. A preferred carbide thermal spray surfacing is a high velocity oxygen fuel process available, for example, by ASB Industries Inc., 1031 Lambert Street, Barberton, Ohio 44203. Any other thermal spray coating process is suitable for the present invention such as described in the Second National Conference on Thermal Spray in Long Beach, Calif., Oct. 31 to Nov. 2, 1984, sponsored by the American Society for Metals. This coating application to a selected portion of shaft (14) in particular shaft end 25, 25' produces a coating having very low porosity, excellent bonding to the shaft surface, and resistance to mechanical or chemical attack. In addition, the coating should resist cracking or separation at surface strains up to approximately ±65 micro inches/inch (corresponding to ±20,000 psi stress) for essentially unlimited number of cycles.

Figure 3:
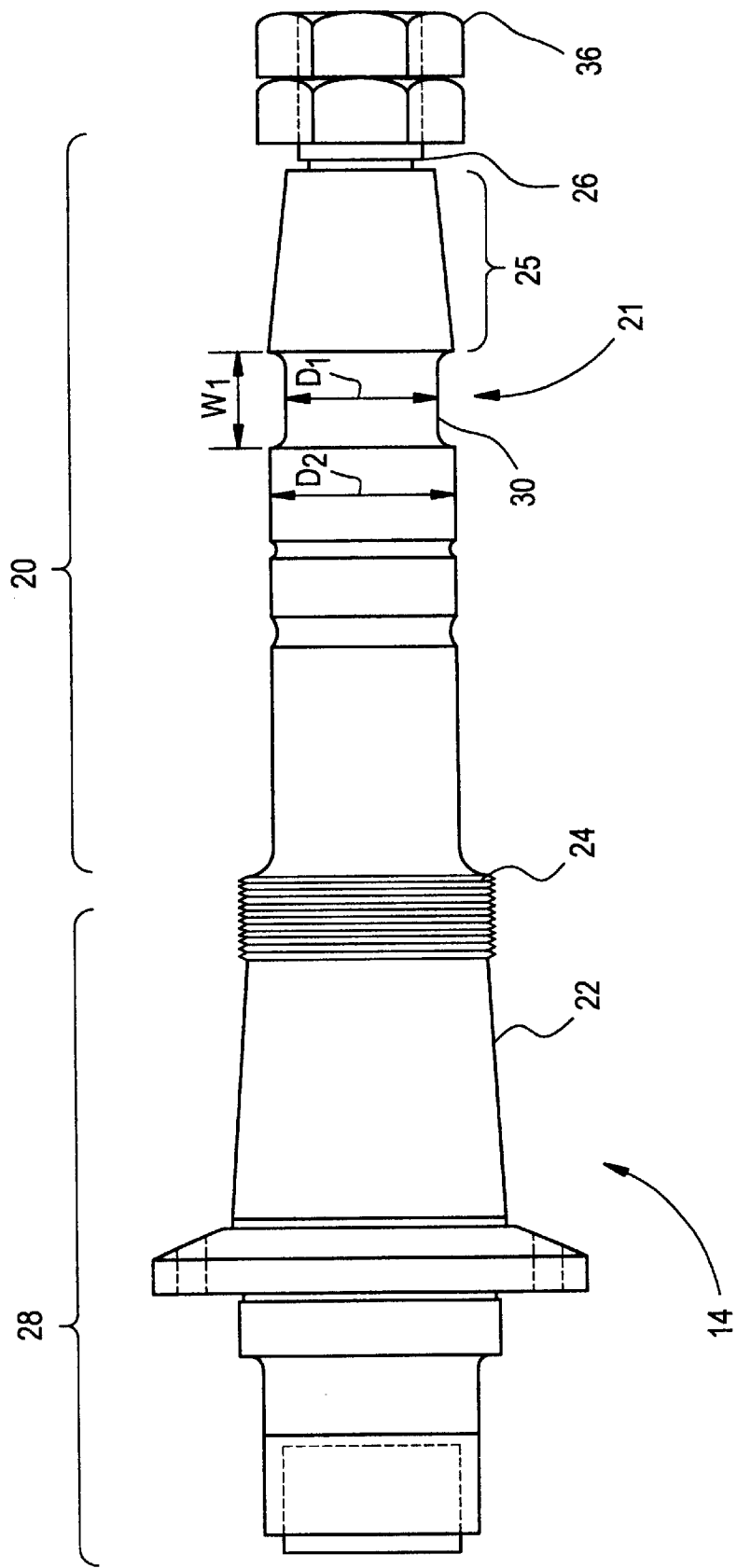
FIG. 3 is an external view of one embodiment according to the present invention of the improved main shaft.

Referring to FIG. 3, the tapered portion (25) is thermally sprayed with a ceramic coating to a final thickness of approximately 0.008 to approximately 0.015 inches with a coating made from chromium oxide, tungsten carbide, or similar high strength, high endurance non-metal. The tapered portion (25) is then finish-ground to the required geometry and finish. Alternatively, tapered portion (25) may be shot-peened prior to the thermal spray step. It is possible to thermal spray to the required thickness and final diameter with an optional shot peening step prior to thermal spraying. An alternate embodiment of the present invention is to apply the above processes to area (20) of the main shaft (14).

Similarly, the present invention finds applicability to any of various embodiments of the main shaft (14). For example in FIG. 4, the cylindrical end (25') of main shaft (14) may be treated as described with respect to tapered end (25). Also, shaft area (20) may be treated as described previously.

There is a significant advantage to the combination of thermal spray and surface treatment such as shot peening. Shot peening leaves a near surface layer in a state of residual compressive stress. Thus, it is resistant to initiation of fatigue cracks. Shot peening by its nature destroys the accurate, dimensionally toleranced surface of the parts to which it is applied. Refinement of the shot peened surface removes part or all of the compressed layer and destroys the effectiveness of the process. Thermal spray provides a layer of material which is highly compliant with the shot peened surface but which can be machine finished to high accuracy on the exterior surface, while leaving the underlying shot-peened surface undisturbed.

Some of the advantages of the present invention include the following. The existing shaft and yoke geometries need not be changed. The application of an intervening layer of coated material allows the use of surface treatments like shot peening which can mutilate the surface, but the final surface is refined with the coating material while leaving the treated surface undisturbed. The intervening layer is of high hardness for maximum resistance to fretting and wear. Minor fretting does not produce stress concentrations in the shaft material. The coating provides protection from mechanical and corrosion damage in the area outside the fitted joint. An additional advantage with the present invention is the ability to use lubricants such as tungsten disulfide on the bushing and the coated tapered end.

While specific embodiments of the invention have been shown and described in detail to illustrate the application of the principles of the invention, it will be understood that the invention may be embodied otherwise without departing from such principles.

We claim:

1. A method for making an improved main shaft for a coal pulverizer, comprising the steps of:
   shot peening a selected portion of the main shaft; and
   thermally spraying a ceramic coating on the selected portion of the main shaft.

2. The method as recited in claim 1, wherein the thermal spraying step includes the step of coating the portion of the main shaft starting at gear center hold down threads to a yoke end of the main shaft.

3. The method as recited in claim 1, further comprising the steps of:
   tempering a bushing to a selected hardness;
   applying a dry film lubricant to the inside of the bushing; and
   positioning the bushing on the yoke end of the main shaft.

4. The method as recited in claim 1, wherein the selected portion of the main shaft comprises a tapered end.

5. The method as recited in claim 1, wherein the selected portion of the main shaft comprises a cylindrical end.

6. The method as recited in claim 1, further comprising the step of finish grinding the ceramic coating.

7. The method as recited in claim 1, wherein the ceramic coating has a thickness of about 0.008 to about 0.015 inches.

8. The method as recited in claim 1, wherein the ceramic coating is a member selected from the group consisting of chromium oxide and tungsten carbide.

9. A method of making an improved main shaft for a coal pulverizer, comprising the steps of:
   a. shot peening a selected portion of the main shaft;
   b. thermally spraying a ceramic coating on a selected portion of the main shaft;
   c. finish grinding the ceramic coating;
   d. tempering a bushing to a selected hardness;
   e. applying a dry film lubricant to the inside of the bushing; and
   f. positioning the bushing on the yoke end of the main shaft.

10. The method as recited in claim 9, wherein the dry film lubricant comprises tungsten disulfide.

11. The method as recited in claim 9, wherein the ceramic coating has a thickness of about 0.008 to about 0.015 inches.

12. The method as recited in claim 9, wherein the ceramic coating is a member selected from the group consisting of chromium oxide and tungsten carbide.

13. A method of making an improved main shaft for a coal pulverizer, comprising the steps of:
   a. applying a surface treatment to a selected portion of the main shaft to leave the near surface layer of the selected portion in a state of residual compressive stress;
   b. applying a ceramic coating on the selected portion of the main shaft; and
   c. finish grinding the ceramic coating.

14. A method as recited in claim 13, wherein the surface treatment comprises shot peening.

15. A method as recited in claim 13, wherein the ceramic coating is thermally sprayed on the shaft.

* * * * *